Nov. 21, 1961    R. W. KETCHLEDGE ET AL    3,010,102
COMBINATION RADAR AND THERMAL-ENERGY DETECTION SYSTEM
Filed July 5, 1947
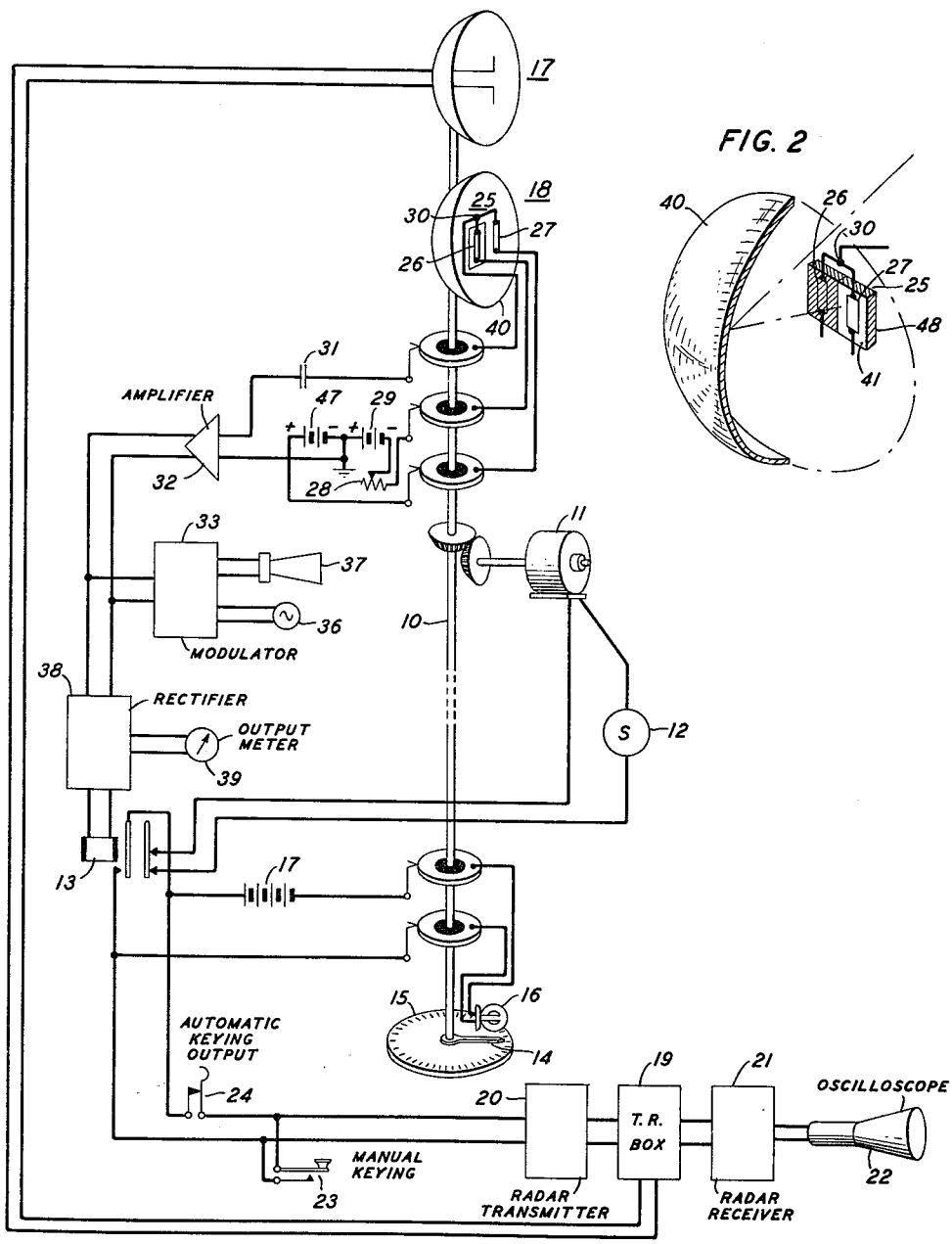
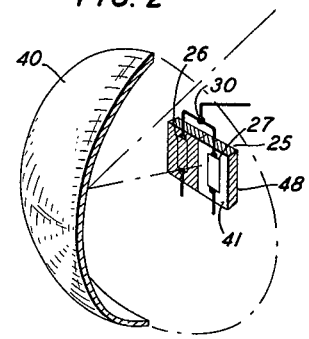
INVENTORS: R. W. KETCHLEDGE
H. R. MOORE
BY
E. V. Griggs
ATTORNEY

United States Patent Office 3,010,102
Patented Nov. 21, 1961

3,010,102
COMBINATION RADAR AND THERMAL-ENERGY DETECTION SYSTEM
Raymond W. Ketchledge, Jamaica, N.Y., and Hilbert R. Moore, Pluckemin, N.J., assignors to Bell Telephone Laboratories, Incorporated, New York, N.Y., a corporation of New York
Filed July 5, 1947, Ser. No. 759,278
5 Claims. (Cl. 343—6)

This invention relates to a system and method for detecting, by means of radiant-energy emissions, the presence, location and range of objects. The system is particularly suitable for detecting objects which are invisible on account of darkness, or which are obscured by mists, fog, clouds or smoke screens, and is also applicable for signaling between vessels and control stations.

An object of the invention is to furnish a method by which the distance and direction of a body from a given point may be determined.

Another object is the detection and location of a body obscured by darkness and invisible to the human eye.

A further object is to insure secrecy in the procurement of bearings.

Numerous object detecting and position determining systems have been developed in the past decade and some have attained a high degree of efficiency, but certain operational limitations appear inherent in all of them. Most of these systems may be classified into two groups, namely those which transmit and receive radiant-energy impulses as do the radar systems, and systems such as the infrared systems which sometimes rely for activation upon radiation emanating from bodies external to themselves. Radar systems operate by projecting radio waves in sharp bursts or pulses of extremely short duration and with a time interval occurring between the pulses. The radar receivers detect the pulse echo reflected back from a target during the pulse interruption interval, and the range of the target is measured by timing the interval occurring between the pulse transmission and the reception of the echo. The duration of this interval determines the detection distance, and sufficient power must be provided to the transmitter to produce a discernible echo pulse from a distant target.

Radar systems are efficient in detection work but have well-known limitations. For example, the use of radar pulses for an appreciable time will reveal one's presence to an alert enemy, and radar is subject to being intercepted, interrupted and jammed by various methods. Also in order to detect distant targets it is necessary to transmit at the maximum power available, and to receive the reflected echoes with extremely sensitive receivers. This in practice means transmitting an output rated in tens or hundreds of kilowatts, increased hundreds of times in effectiveness by means of directive antennae, and receiving back an echo power that is often measured in microwatts. In addition there are instances where radar cannot be relied upon to fulfill its purpose, for during the late hostilities numerous ships eluded radar detection by remaining near or sailing close to a shore line so as to integrate their mass with the coast, and render themselves immune to detection from a radar viewpoint. Radar also has a disadvantage from the fact that its minimum effective range is often larger than desired, and it is inept in measuring collision distances.

In the accomplishment of their purposes thermal-energy detection systems are usually actuated by the thermal-radiations emanating from a target. It will be readily perceived that such systems can detect the presence of a ship that is situated close to a shore line by contrasting the thermal-radiations received from the ship with those received from the shore line. It is known that any object a few degrees warmer than its immediate surroundings will emit more radiation than will be emitted by the surroundings. This emitted radiation can be concentrated by means of lenses or mirrors so as to form infra-red images of the panorama in the same manner as visible images may be formed. These thermal-energy detectors have effective ranges of upwards of ten miles and are also efficient at collision distances. Since these thermal-energy detectors emit no telltale signals, secrecy in the procurement of an object bearing is maintained. Efficient systems have been developed which weigh less than twenty pounds and are sensitive enough to detect emissions from a man's hand at a distance of 500 feet, and capable of locating a major heat source at a distance of upwards of ten miles. Some of these heat systems have angles of view of two degrees, and they can sweep out an area at a rate of scan amounting to one hundred and twenty degrees per second.

By utilizing a thermal-energy detection system in conjunction with a radar system the best features of both systems may be realized. In the preferred form of the invention, as described herein, a radar system and a thermal-energy detection system cooperate and mutually complement each other. The radar antenna and the optical components of the thermal-energy detection system are mounted upon a rotatable mast or shaft in cooperative and directional alignment with each other. The radar is held normally inoperative, and the thermal optical units are operative and are moved towards particular sections of an area of scan, and collect thermal-energy from the section under observation. Whenever a temperature discontinuity source is encountered a variation occurs in the amount of thermal-energy received by the thermal-energy detector. This variation is translated into electrical fluctuations which halt the rotation of the shaft upon which the scanning elements are mounted, thus placing the radar antenna and the thermal optical units at rest in alignment with the temperature discontinuity source. This same operation also energizes the radar system. A direction position indicator attached to the shaft indicates the direction of the source initiating the variations. A few pulses are emitted and their echo pulses received back and translated by the radar system. The bearing and range of the temperature discontinuity source is promptly and accurately determined from the combination system, and is processed and presented by well-known techniques. An alarm may be operated whenever a temperature discontinuity source is encountered, and an indication of the size of the source obtained by measuring the intensity of the variations initiated in the thermal-energy detection system.

Thermal-energy detectors usually contain an element which is extremely sensitive to temperature variations. This element may be a thermocouple or a thermopile such as shown in Patent 2,392,873, issued January 15, 1946, to H. A. Zahl, or the sensitive element may be a photoelectric cell as is shown in Patent 2,237,183 issued April 1, 1941, to E. G. H. Mobsby, or any suitable element may be utilized.

In the preferred form of the invention as described herein, a thermistor-bolometer unit is used as the radiant-energy sensitive element. A bolometer is a device utilized to measure or record small quantities of radiant heat energy by means of thermally induced changes in its resistance. Some thermistors have the characteristic that over certain ranges of their current-voltage relationships they act as a negative resistance, for as the current through the thermistor increases the voltage across it decreases. Thermistors may be constructed in any suitable manner such as that disclosed in Patent 2,414,793, issued January 28, 1947, to J. A. Becker and H. Christensen.

Suitable materials for use in their manufacture are one or more of the oxides of nickel, zinc, copper, iron or cobalt. Good results are obtained with a thermistor material comprising the combined oxides of manganese, nickel and cobalt. When installed in a bolometer the thermistor usually comprises a resistance strip which constitutes part of a series circuit and, the applied voltage being constant, a certain value of current will flow. When radiant-energy impinges on the thermistor strip its resistance changes and a voltage initiated by the resulting change in current, is fed to an amplifier the output of which actuates signal indicating or recording equipment. Approximately $10^{-7}$ watts of thermal energy impinging upon this type of detector will initiate a signal. The temperature of the thermistor strip may increase by about a millionth of a degree centigrade upon receipt of weak signals, and the voltage delivered to the amplifier may measure about one microvolt.

Referring to the drawings:

FIG. 1 is a schematic diagram of the component parts of an equipment embodying the invention; and FIG. 2 is a schematic detail of the thermal-energy optical units used in connection with the equipment of FIG. 1.

The following is a description, by way of example, of a convenient arrangement in accordance with the invention with reference to the accompanying drawings.

Referring to FIG. 1 there is shown a shaft 10 adapted for rotation and driven through a gear mechanism by a motor 11, which derives its energy from the electromotive source 12 through a circuit which includes the back contacts of a relay 13. Attached to one end of the shaft 10 is a pointer 14 which turns with the shaft above a fixed chart 15. Chart 15 is calibrated in degrees so that the orientation of the shaft at a particular instant may be determined by observing the position of the pointer 14 in its relation to the chart. Also in cooperation with the shaft 10 is a lamp 16 which is energized from an electromotive source 17 through the front contacts of relay 13. The energizing circuit to lamp 16 is completed through a pair of slip-rings attached to shaft 10, but insulated therefrom as illustrated. Lamp 16 illuminates the chart and pointer, and also acts as an alarm for an observer, so that the position of the pointer in its relation to the chart may be observed at the instant the relay 13 operates. Also mounted upon the shaft 10, and in directional alignment with each other, are a conventional radar dipole antenna 17, and the scanning unit 18 of a thermal-energy detection system. With the radar antenna 17 there is associated the usual TR box 19, transmitter 20, receiver 21 and a signal presentation oscilloscope 22. The radar system is such as is well known in the art, and the transmitter, receiver and TR box may be of the types disclosed in the articles by Miller Proc. IRE, April 1947, page 340, and by Samuel, Clark and Mumford, Bell System Technical Journal, January 1946, page 48. It operates by transmitting time spaced pulses from the transmitter 20 through the TR box 19 to the antenna unit 17 whence they are projected into space. During the intervals occurring in the pulse transmission the pulse echo is received by the antenna unit 17 and fed through the TR box to the receiver 21, wherein the echo pulses are processed and translated and presented as visual indications on the screen of the oscilloscope 22. The circuit to energize the radar transmitter system is completed through the front contacts of the relay 13. These front contacts are normally open. However, the radar energizing circuit may be closed at any time by the manual or automatic operation of the key 23, thus making the radar energization independent of the relay 13 at will. When the relay 13 is operated, and the radar energizing circuit is completed through the relay front contacts, the jack 24 furnishes a convenient point for introducing an automatic keying controller which may be utilized to limit the radar operational time. By operating the jack 24 the radar energizing circuit is opened and the transmission of pulses is stopped.

In the unit 18 of the thermal-energy detection system is a parabolic reflector 40. In the reflector focal plane is a bolometer unit 25 containing a pair of thermistor-strips 26 and 27.

Referring to FIG. 2 the bolometer unit 25 may be constructed as shown in United States Patent 2,414,792, issued January 28, 1947, to J. A. Becker, or according to any suitable method of construction. The unit 25 comprises a housing 48, enclosing the strips 26 and 27, which is opaque to thermal-energy. In the housing 48 and facing the reflector 40, the right-hand portion of which is broken away, is a window 41 through which thermal-energy emissions may enter. The thermistor-strip 26 is completely shielded, by the bolometer-housing 48, from thermal-energy radiations which may impinge upon the housing. The thermistor-strip 27 is likewise shielded by the housing 48 but, thermal-energy radiations can be focussed upon the front surface of this strip by the reflector 40 through the window 41.

Referring again to FIG. 1, the strips 26 and 27 are connected as illustrated and form arms of a bridge configuration which includes a rheostat 28 and the biasing electromotive sources 29 and 47. The rheostat 28 is adjusted so that the bridge circuit containing the strips is normally in balance. The common junction point 30 which joins the strips is connected through a coupling condenser 31 to an amplifier 32. The circuit connections to the strips are completed through three slip rings which are attached to shaft 10 but insulated therefrom as illustrated. A portion of the output of the amplifier 32 is fed to a modulator 33 with which are associated an alarm device 37, and an alternating current source of audio frequency 36. The modulator 33 is interposed between the source 36 and the alarm or loudspeaker 37 and may be of any suitable type to connect these elements in conjugate relation. Accordingly, the audible frequency energy supplied by source 36 will not, in the absence of detected signals from source 32, affect the alarm 37. However, during receipt of detected signals the conjugate device or modulator 33 is unbalanced to permit current to flow from source 36 thus initiating an audible signal in alarm 37. Another portion of the output of the amplifier 32 is fed to a rectifier 38 with which is associated an indication meter 39. Meter 39 serves to indicate the size of a source originating a signal by measuring the intensity of the currents produced by variations in the amounts of collected thermal energy. The output from the rectifier 38 energizes the relay 13.

The equipment operates as follows: The bridge circuit is maintained in normal balance and the parabolic reflector 40 in its revolutions with the shaft 10 gathers thermal-energy from the area under observation and focuses it upon the exposed thermistor-strip 27. When in the course of the scanning operation a body is encountered from which the thermal-diffusion is greater or less than that from the area of scan per se, a temperature discontinuity originates, and a change occurs in the amount of thermal-energy received by the reflector. Accordingly, a change occurs in the intensity of the radiation impinging upon the exposed strip 27. The temperature of strip 27 changes and initiates a corresponding change in the strip resistance and an unbalance of the bridge circuit. This phenomenon initiates a voltage variation at the junction point 30 between the point 30 and ground. This voltage variation is fed, through the coupling condenser 31, to the amplifier 32. The amplifier output actuates the alarm 37 and energizes the relay 13. Relay 13 in operating, opens the circuit energizing the motor 11, halts the revolutions of the shaft 10, and places the units 17 and 18 at rest in directional alignment with the source initiating the temperature discontinuity. Relay 13 in operating, energizes the lamp 16 which illuminates the chart 14, so that an observer informed of the fact that a discontinuity-source has been sighted, may determine the direction in which the anomaly is situated from the position of the pointer 14. Relay 13 in operating, also energizes the radar system transmitter 20, and a series of radar pulses are transmitted and the echo pulses received back from the discontinuity source. A polar range presentation thereupon appears upon screen of the oscilloscope 22. The bearings and range of the temperature discontinuity source in relation to the detecting system are thus readily determined.

Various modifications may be made within the scope of the invention and it can be utilized for purposes other than that specified above within the scope of the invention as defined in the following claims.

What is claimed is:

1. In a radiant-energy system for detecting and locating the presence and position of a body by means of radiant-energy emanating from said body, said radiant-energy having a wavelength below .5 millimeter, the combination of, a thermal-emission detection system in cooperative association with a radar system, said radar system being normally silent, a unit sensitive to thermal-emissions contained in said thermal system, said unit initiating voltage variations whenever the amount of emissions impinging thereon varies, an antenna contained in said radar system, said unit and antenna mounted in directional and operational association with each other, means for orientating said unit and antenna towards said body, and means under control of said voltage variations for energizing said radar system.

2. In a radiant-energy detection system for scanning a field, the combination of, a radar system and a thermal-emission scanning system teamed in operative conjunction with said radar system said radar system being normally silent, a thermal-emission sensitive element contained in said thermal scanning system, means for collecting thermal-emissions from said field and focussing them upon said element, means for motivating said detection system towards sections of said field, means for originating a voltage transient under control of said element whenever the thermal-emission focussed upon said element from said field varies during scanning operations, and means responsive to said voltage transient for actuating said radar system.

3. A system for detecting the presence and locating the position of a body in an area of scan, comprising in combination, a thermal-energy detection system and a radar system disposed adjacently to each other, said thermal system being normally operative and said radar system normally inactive, an element responsive to thermal-radiations falling within the infra-red, visible and ultra-violet wavelength bands, said element contained within said thermal system, means for scanning said area collecting thermal-energy radiations emanating therefrom and directing them upon said element, means connected to said element for originating voltage variations whenever a temperature anomaly is encountered in said area, and means under control of said voltage variations for energizing said radar system.

4. A detection equipment for scanning an area under observation to detect the position and obtain the range of an object situated in said area, said object having a temperature different from that of said area per se, and said equipment comprising a radar system and a thermal-energy detection system, the scanning units of each of said systems being teamed in directional alignment with each other and said radar system being normally silent and said thermal-energy system normally active, the combination of, a thermal-energy sensitive element, means for scanning said area collecting thermal-energy radiations emanating therefrom and directing them upon said element, a circuit containing said element, means in said circuit for initiating voltage variations whenever a temperature anomaly is encountered in said area, means under control of said variations for actuating an alarm when said anomaly is encountered, means for substantially establishing the magnitude of said anomaly, means for obtaining the direction of said anomaly relative to a datum point, and means under control of said voltage variations for actuating said radar system whereby a series of radio pulses are transmitted towards the source of said temperature anomaly.

5. In a detection system, including a radar system and a thermal-energy detection system for scanning an area to locate and obtain the bearings and range of a body situated within said area, said radar and thermal system each having a scanning unit, the combination comprising, means for maintaining the scanning units of said systems in directional alignment with each other, means for maintaining said radar system normally inactive under control of said thermal-energy system, means for directing said scanning units towards sections of said area in succession, and automatic means responsive to said thermal-energy detection system for actuating said radar system.

References Cited in the file of this patent

UNITED STATES PATENTS

| Re. 16,181 | Hammond | Oct. 6, 1925 |
| 1,385,657 | Bell et al. | July 26, 1921 |
| 1,542,937 | Hammond | June 23, 1925 |
| 1,747,664 | Droitcour | Feb. 18, 1930 |
| 2,410,831 | Maybarduk et al. | Nov. 12, 1946 |
| 2,417,112 | Kettering | Mar. 11, 1947 |
| 2,424,193 | Rost et al. | July 15, 1947 |
| 2,446,024 | Porter et al. | July 27, 1948 |

OTHER REFERENCES

"Engineering Test Manual for May 1937, Experimental Types of Detectors for Use Against Aircraft," Section II, Engineering Characteristics, pp. 3, 4 and 5.